United States Patent
VanBuskirk et al.

(10) Patent No.: US 8,945,365 B2
(45) Date of Patent: Feb. 3, 2015

(54) ELECTRODEPOSITABLE COATING COMPOSITIONS EXHIBITING RESISTANCE TO CRATERING

(75) Inventors: Ellor J. VanBuskirk, Pittsburgh, PA (US); Joseph Swanger, Natrona Heights, PA (US); Craig Wilson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 293 days.

(21) Appl. No.: 13/548,499

(22) Filed: Jul. 13, 2012

(65) Prior Publication Data

US 2014/0014524 A1 Jan. 16, 2014

(51) Int. Cl.
 *C09D 163/00* (2006.01)
 *C25D 9/02* (2006.01)

(52) U.S. Cl.
 USPC ........... 205/317; 205/118; 204/488; 428/418; 523/427

(58) Field of Classification Search
 USPC ................. 205/118, 317; 204/488; 428/418; 523/427
 See application file for complete search history.

(56) References Cited

U.S. PATENT DOCUMENTS

| | | | |
|---|---|---|---|
| 3,661,819 A | 5/1972 | Koral et al. | |
| 3,677,984 A | 7/1972 | Aschkenasy et al. | |
| 3,939,110 A | 2/1976 | Colberg et al. | |
| 3,980,602 A | 9/1976 | Jakubauskas | |
| 4,008,140 A | 2/1977 | Fritsche | |
| 4,037,018 A | 7/1977 | McGinniss | |
| 4,647,604 A | 3/1987 | Kempter et al. | |
| 5,157,060 A | 10/1992 | Redman | |
| 5,319,019 A | 6/1994 | Nothnagel | |
| 5,360,839 A | 11/1994 | Tanimoto et al. | |
| 5,837,766 A | 11/1998 | Metro et al. | |
| 6,033,545 A | 3/2000 | Kaylo et al. | |
| 6,093,298 A | 7/2000 | Kaylo et al. | |
| 6,132,581 A | 10/2000 | Kaylo et al. | |
| 6,165,338 A | 12/2000 | December et al. | |
| 6,190,523 B1 | 2/2001 | Tazzia | |
| 6,333,367 B1 | 12/2001 | Kato et al. | |
| 6,355,351 B1 | 3/2002 | Sawada et al. | |
| 6,372,823 B1 | 4/2002 | Furukawa et al. | |
| 6,887,360 B2 * | 5/2005 | Retzlaff et al. | 204/489 |
| 8,414,753 B2 | 4/2013 | Okada et al. | |
| 2002/0068176 A1 | 6/2002 | Yokoyama et al. | |
| 2010/0243455 A1 | 9/2010 | Van Buskirk et al. | |
| 2013/0075269 A1 | 3/2013 | Johnson et al. | |

FOREIGN PATENT DOCUMENTS

| | | | |
|---|---|---|---|
| DE | 2752255 | 6/1978 | |
| EP | 0229459 | 5/1990 | |
| EP | 1743925 | 1/2007 | |
| EP | 2580287 | 4/2013 | |
| GB | 1545390 | 5/1979 | |
| JP | 57061069 | 4/1982 | |
| JP | 04001278 | 1/1992 | |
| JP | 10110124 | 4/1998 | |
| JP | 10110125 | 4/1998 | |
| JP | 2001234116 | 8/2001 | |
| JP | 2003-277681 | * 10/2003 | C09D 163/00 |
| JP | 2003277681 | 10/2003 | |
| JP | 2009138126 | 6/2009 | |
| WO | 9303101 | 2/1993 | |
| WO | 0177239 | 10/2001 | |
| WO | WO 01/77239 A3 | * 10/2001 | C09D 163/00 |
| WO | 2004060945 | 7/2004 | |
| WO | 2009118172 | 10/2009 | |

* cited by examiner

*Primary Examiner* — Robert D. Harlan
(74) *Attorney, Agent, or Firm* — Alicia Passerin, Esq.

(57) ABSTRACT

The present invention relates to electrodepositable coating compositions that produce cured coatings that exhibit resistance to cratering. The coating compositions include an active hydrogen-containing cationic salt group-containing polymer; and 0.1 to 20 percent by weight, based on the total weight of resin solids in the coating composition, of an ungelled acrylic polymer.

21 Claims, No Drawings

US 8,945,365 B2

ELECTRODEPOSITABLE COATING COMPOSITIONS EXHIBITING RESISTANCE TO CRATERING

FIELD

The present invention relates to electrodepositable coating compositions that exhibit resistance to crater-like defects.

BACKGROUND

Various additives, such as siloxanes, acrylates, and polybutene dienes, have been employed in electrodepositable coating compositions to impart crater resistance and resistance to oil contamination. In many cases, however, the coating deposited from such coating compositions exhibits poor intercoat adhesion with coating layers that are subsequently applied thereto. Therefore, electrodepositable coating compositions that produce cured coatings that exhibit resistance to cratering, good adhesion to subsequently applied coatings, and a desirable smooth appearance, are desired.

SUMMARY OF THE INVENTION

In certain respects, the present invention is directed to electrodepositable coating compositions comprising: (a) an active hydrogen-containing cationic salt group-containing polymer; and (b) 0.1 to 20 percent by weight, based on the total weight of resin solids in the coating composition, of an active hydrogen-containing cationic salt group-containing ungelled acrylic polymer, different from (a), that comprises a reaction product of an ethylenically unsaturated monomer composition comprising: (i) a hydroxy-functional ethylenically unsaturated monomer; (ii) at least 10 percent by weight, based on the total weight of the ethylenically unsaturated monomer composition, of an amine-functional ethylenically unsaturated monomer; (iii) 10 to 40 percent by weight, based on the total weight of the ethylenically unsaturated monomer composition, of an alkyl(meth)acrylate having at least 8 carbon atoms in the alkyl group; and at least one of: (iv) 1 to 20 percent by weight, based on the total weight of the ethylenically unsaturated monomer composition, of an alkyl(meth)acrylate having less than 8 carbon atoms in the alkyl group; and (v) 1 to 30 percent by weight, based on the total weight of the ethylenically unsaturated monomer composition, of a vinyl aromatic monomer.

In other respects, the present invention is directed to electrodepositable coating compositions comprising: (a) an active hydrogen-containing cationic salt group-containing polymer; and (b) 0.1 to 20 percent by weight, based on the total weight of resin solids in the coating composition, of an active hydrogen-containing cationic salt group-containing ungelled acrylic polymer, different from (a), that comprises a reaction product of an ethylenically unsaturated monomer composition comprising: (i) a hydroxy-functional ethylenically unsaturated monomer; (ii) at least 10 percent by weight, based on the total weight of the ethylenically unsaturated monomer composition, of an amine-functional ethylenically unsaturated monomer; (iii) an alkyl(meth)acrylate having at least 8 carbon atoms in the alkyl group; wherein the ethylenically unsaturated monomer composition comprises less than 1 percent by weight, based on the total weight of the ethylenically unsaturated monomer composition, of an ether group containing ethylenically unsaturated monomer.

In yet other respects, the present invention is directed to electrodepositable coating compositions comprising: (a) an active hydrogen-containing cationic salt group-containing polymer; and (b) 0.1 to 20 percent by weight, based on the total weight of resin solids in the coating composition, of an adduct of reactants comprising: (i) an at least partially unblocked isocyanate; and (ii) an active hydrogen containing ungelled acrylic polymer having a calculated glass transition temperature of no more than 40° C.

The present invention is also directed to, among other things, methods for using such coating compositions and substrates at least partially coated with a cured coating deposited from such compositions.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be understood that the various coating layers that are described herein result from various coating compositions. For example, an electrodeposited coating layer results from an electrodeposited coating composition after such coating composition is cured.

As used herein, the term "cure" refers to a coating wherein any crosslinkable components of the composition are at least partially crosslinked.

As used herein, the term "(meth)acrylate" is a chemical notation that indicates that a compound has an acrylate ($CH_2$=CHCOO—) and/or a methacrylate ($CH_2$=$CCH_2$COO—) group.

As indicated earlier, the present invention is directed electrodepositable coating compositions. As used herein, the term "electrodepositable coating composition" refers to a composition that is capable of being deposited onto an electrically conductive substrate under the influence of an applied electrical potential.

The electrodepositable coating compositions of the present invention comprise an active hydrogen-containing, cationic salt group-containing polymer. As used herein, the term "active hydrogen-containing, cationic salt group-containing polymer" refers to a polymer that includes active hydrogen functional groups and at least partially neutralized cationic groups, such as sulfonium groups and amine groups, which impart a positive charge. As used herein, the term "polymer" encompasses, but is not limited to, oligomers and both homopolymers and copolymers. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927) and include, for example, hydroxyl groups, primary or secondary amine groups, and thiol groups. In certain embodiments, the active hydrogen functional groups are hydroxyl groups, primary amine groups and/or secondary amine groups.

Examples of polymers that are suitable for use as the active hydrogen-containing, cationic salt group-containing polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group-containing polymers include polyepoxide-amine adducts, such as adducts of a polyglycidyl ether of a polyphenol, such as Bisphenol A, and a primary and/or secondary amine, such as those described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketimine of a polyamine, as is described in U.S. Pat. No. 4,104,117 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which being incorporated herein by reference, can be used.

Besides amine salt group-containing resins, quaternary ammonium salt group-containing resins can also be employed as a cationic salt group-containing polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7, U.S. Pat. No. 3,975,346 at col. 1, line 62 to col. 17, line 25, and U.S. Pat. No. 4,001,156 at col. 1, line 37 to col. 16, line 7, these portions of which being incorporated herein by reference. Other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Other suitable cationic salt group-containing resins include those that may form photodegradation resistant electrodepositable coating compositions. Such polymers include the polymers comprising cationic amine salt groups which are derived from pendant and/or terminal amino groups that are disclosed in U.S. Patent Application Publication No. 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Patent Application Publication No. US 2003/0054193 A1 at [0096] to [0123], this portion of which being incorporated herein by reference.

To render the polymer dispersible in an aqueous medium, the polymer is, prior to or during dispersion in a dispersing medium comprising water, at least partially neutralized by, for example, treating with an acid to form a water-dispersible cationic salt group-containing polymer. Non-limiting examples of suitable acids are inorganic acids, such as phosphoric acid and sulfamic acid, as well as organic acids, such as acetic acid and lactic acid, among others. Besides acids, salts such as dimethylhydroxyethylammonium dihydrogenphosphate and ammonium dihydrogenphosphate, can be used. In certain embodiments, the polymer is neutralized to the extent of at least 50 percent or, in some cases, at least 70 percent, of the total theoretical neutralization equivalent. The step of dispersion may be accomplished by combining the neutralized or partially neutralized polymer with the water of the dispersing phase. Neutralization and dispersion can be accomplished in one step by combining the polymer and the water. As used herein, "water dispersible" means that a material is adapted to be solubilized, dispersed, and/or emulsified in water.

In certain embodiments, the one or more active hydrogen-containing, cationic salt group-containing polymer(s) are present in the electrodepositable coating composition in an amount of 50 to 99 percent by weight, such as 70 to 95 percent by weight, based on the total resin solids weight of the composition.

In certain embodiments, the electrodepositable coating compositions of the present invention further include a curing agent to react with the active hydrogen groups of the cationic salt group-containing polymer described above and/or the ungelled acrylic polymer described below. Non-limiting examples of suitable curing agents are at least partially blocked polyisocyanates, aminoplast resins and phenolic resins, such as phenolformaldehyde condensates including allyl ether derivatives thereof.

Suitable at least partially blocked polyisocyanates include aliphatic polyisocyanates, aromatic polyisocyanates, and mixtures thereof. In certain embodiments, the curing agent comprises an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. I line 57 to col. 3 line 15, this portion of which being incorporated herein by reference, or partially blocked aliphatic polyisocyanates that are reacted with the polymer backbone, such as is described in U.S. Pat. No. 3,947,338 at col. 2 line 65 to col. 4 line 30, this portion of which also being incorporated herein by reference. By "blocked" is meant that the isocyanate groups have been reacted with a compound such that the resultant blocked isocyanate group is stable to active hydrogens at ambient temperature but reactive with active hydrogens at elevated temperatures usually between 90° C. and 200° C. In certain embodiments, the polyisocyanate curing agent is a fully blocked polyisocyanate with substantially no free isocyanate groups.

In certain embodiments, the curing agent comprises a diisocyanate, though, in other embodiments, higher polyisocyanates are used in lieu of or in combination with diisocyanates. Examples of aliphatic polyisocyanates suitable for use as curing agents include cycloaliphatic and araliphatic polyisocyanates such as 1,6-hexamethylene diisocyanate, isophorone diisocyanate, bis-(isocyanatocyclohexyl)methane, polymeric 1,6-hexamethylene diisocyanate, trimerized isophorone diisocyanate, norbornane diisocyanate and mixtures thereof. In certain embodiments of the present invention, the curing agent comprises a fully blocked polyisocyanate selected from a polymeric 1,6-hexamethylene diisocyanate, isophorone diisocyanate, and mixtures thereof. In other embodiments of the present invention the polyisocyanate curing agent comprises a fully blocked trimer of hexamethylene diisocyanate available as Desmodur N3300® from Bayer Corporation. Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), m-xylene diisocyanate (XDI) and 1,4-phenylene diisocyanate, including polymers thereof and mixtures thereof.

In certain embodiments, the polyisocyanate curing agent is at least partially blocked with at least one blocking agent selected from, for example, a 1,2-alkane diol, such as 1,2-propanediol; a 1,3-alkane diol, such as 1,3-butanediol; a benzylic alcohol, such as benzyl alcohol; an allylic alcohol, such as allyl alcohol; caprolactam; a dialkylamine, such as dibutylamine; and mixtures thereof. In certain embodiments, the polyisocyanate curing agent is at least partially blocked with at least one 1,2-alkane diol having three or more carbon atoms, for example 1,2-butanediol.

In certain embodiments, the blocking agent comprises other well known blocking agents such as aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

Examples of suitable aminoplast resins include those described in U.S. Pat. No. 3,937,679 at col. 16, line 3 to col. 17, line 47, this portion of which being hereby incorporated by reference. As is disclosed in the aforementioned portion of the '679 patent, the aminoplast can be used in combination with methylol phenol ethers.

In certain embodiments, the equivalent ratio of functional groups in the curing agent to equivalents in the active hydrogen-containing cationic salt group-containing polymer(s) is within the range of 1:3 to 3:1. In certain embodiments, the curing agent is present in the coating composition in an amount of 1 to 45 percent by weight, based on the total weight of resin solids in the coating composition.

The electrodepositable coating compositions of the present invention also comprise an additive polymer that improves the crater resistance of the coating in which the coating also has good adhesion to subsequently applied coatings. Thus, in certain embodiments, the coating compositions of the present invention comprise 0.1 to 20 percent by weight, such as 1 to 10 percent by weight, or, in some cases 2 to 8 percent by weight, or, in yet other cases, 4 to 5 percent by weight, of a cationic salt group-containing ungelled acrylic polymer, based on the total weight of resin solids in the coating composition, wherein such ungelled acrylic polymer is different from the active hydrogen-containing cationic salt group-containing polymer described above.

As used herein, the term "ungelled" means the acrylic polymer is substantially free of crosslinking and has an intrinsic viscosity when dissolved in a suitable solvent, as determined, for example, in accordance with ASTM-D1795 or ASTM-D4243. The intrinsic viscosity of the acrylic polymer is an indication of its molecular weight. A gelled reaction product, on the other hand, since it is of essentially infinitely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

In certain embodiments, the ungelled acrylic polymer comprises a reaction product of an ethylenically unsaturated monomer composition comprising: (i) a hydroxy-functional ethylenically unsaturated monomer and (ii) an amine-functional ethylenically unsaturated monomer.

Suitable hydroxy-functional ethylenically unsaturated monomers (i) that may be utilized to make the ungelled acrylic polymer include, but are not limited to, hydroxyethylacrylate ("HEA"), hydroxyethylmethacrylate ("HEMA"), hydroxypropylacrylate ("HPA"), hydroxypropylmethacrylate ("HPMA"), hydroxybutylacrylate ("HBA"), and hydroxybutylmethacrylate ("HBMA"), including combinations of two or more thereof.

In certain embodiments, the hydroxy-functional ethylenically unsaturated monomer is present in an amount of at least 10 percent by weight, such as at least 15 percent by weight, or, in some cases, at least 20 percent by weight, based on the total weight of the ethylenically unsaturated monomer composition used to make the ungelled acrylic polymer. In certain embodiments, the hydroxy-functional ethylenically unsaturated monomer is present in an amount of no more than 60 percent by weight, such as no more than 50 percent by weight, or, in some cases, no more than 40 percent by weight, based on the total weight of the ethylenically unsaturated monomer composition used to make the ungelled acrylic polymer.

Suitable amine-functional ethylenically unsaturated monomers (ii) that may be utilized to make the ungelled acrylic polymer include, but are not limited to, 2-(dimethyamino)ethylmethacrylate ("DMAEMA"), 2-(dimethylamino)ethyl acrylate, 3-(dimethylamino)propyl acrylate, 2-(diethylamino)ethyl acrylate, 2-(tert-butylamino)ethyl methacrylate, and 2-(diethylamino)ethyl methacrylate, including combinations or two or more thereof.

In certain embodiments, in addition to the compounds described in the previous paragraph, suitable amine-functional ethylenically unsaturated monomers may be the reaction product of reactants comprising a glycidyl-functional ethylenically unsaturated monomer and an amine-containing material. Suitable glycidyl-functional ethylenically unsaturated monomers that may be used include, but are not limited to, glycidyl methacrylate and glycidyl acrylate. Suitable amine-containing materials include, but are not limited to, methyl ethanol amine, bis-2-ethylhexyl amine, diethanol amine, diethyl amine, dipropyl amine and morpholine.

It certain embodiments, the amine functionality of the ungelled acrylic polymer does not result from reaction of an acrylic copolymer comprising oxirane rings that is reacted with a secondary amine to open the oxirane ring with the secondary amine.

In certain embodiments, the amine-functional ethylenically unsaturated monomer is present in an amount of at least 10 percent by weight, such as at least 15 percent by weight, or, in some cases, at least 20 percent by weight, based on the total weight of the ethylenically unsaturated monomer composition used to make the ungelled acrylic polymer. In certain embodiments, the amine-functional ethylenically unsaturated monomer is present in an amount of no more than 70 percent by weight, such as no more than 60 percent by weight, or, in some cases, no more than 50 percent by weight, based on the total weight of the ethylenically unsaturated monomer composition used to make the ungelled acrylic polymer.

In certain embodiments, the ungelled acrylic polymer comprises a reaction product of an ethylenically unsaturated monomer composition further comprising (iii) an alkyl(meth)acrylate having at least 8 carbon atoms in the alkyl group. Specific examples of such monomers include, but are not limited to, 2-ethylhexyl(meth)acrylate, lauryl(meth)acrylate, isobornyl(meth)acrylate, norbornyl(meth)acrylate, isononyl (meth)acrylate, decyl(meth)acrylate, isodecyl(meth)acrylate, stearyl(meth)acrylate, 3,3,5-trimethylcyclohexyl(meth)acrylate, and dodecyl(meth)acrylate, including combinations of two or more thereof.

In certain embodiments, the alkyl(meth)acrylate having at least 8 carbon atoms in the alkyl group is present in an amount of at least 10 percent by weight, such as at least 15 percent by weight, based on the total weight of the ethylenically unsaturated monomer composition used to make the ungelled acrylic polymer. In certain embodiments, the alkyl(meth)acrylate having at least 8 carbon atoms in the alkyl group is present in an amount of no more than 40 percent by weight, such as no more than 30 percent by weight, based on the total weight of the ethylenically unsaturated monomer composition used to make the ungelled acrylic polymer.

In certain embodiments, the ungelled acrylic polymer comprises a reaction product of an ethylenically unsaturated monomer composition further comprising (iv) an alkyl(meth)acrylate having less than 8 carbon atoms in the alkyl group. Specific examples of such monomers, which are suitable for use in the present invention include, but are not limited to, methyl(meth)acrylate, ethyl(meth)acrylate, isobutyl(meth)acrylate, butyl(meth)acrylate, hexyl(meth)acrylate, t-butyl(meth)acrylate, and propyl(meth)acrylate, as well as combinations of two or more thereof.

In certain embodiments, the alkyl(meth)acrylate having less than 8 carbon atoms in the alkyl group is present in an amount of at least 1 percent by weight, such as at least 5 percent by weight, or, in some cases, at least 10 percent by weight, based on the total weight of the ethylenically unsaturated monomer composition used to make the ungelled acrylic polymer. In certain embodiments, the alkyl(meth)acrylate having less than 8 carbon atoms in the alkyl group is present in an amount of no more than 40 percent by weight, such as no more than 30 percent by weight, based on the total weight of the ethylenically unsaturated monomer composition used to make the ungelled acrylic polymer.

In certain embodiments, the ungelled acrylic polymer comprises a reaction product of an ethylenically unsaturated monomer composition further comprising (v) a vinyl aromatic monomer. Specific examples of such monomers, which are suitable for use in the present invention include, but are not limited to, styrene, α-methylstyrene, vinyltoluene, p-methylstyrene, ethylvinylbenzene, vinylnaphthalene, and vinylxylene, including combinations of two or more thereof.

In certain embodiments, the vinyl aromatic monomer is present in an amount of at least 1 percent by weight, such as at least 2 percent by weight, or, in some cases, at least 3 percent by weight, based on the total weight of the ethylenically unsaturated monomer composition used to make the ungelled acrylic polymer. In certain embodiments, vinyl aromatic monomer is present in an amount of no more than 20 percent by weight, such as no more than 10 percent by weight, or, in some cases, no more than 7 percent by weight, based on the total weight of the ethylenically unsaturated monomer composition used to make the ungelled acrylic polymer.

In certain embodiments, the ethylenically unsaturated monomer composition from which the ungelled acrylic polymer is formed includes less than 1 percent by weight, such as no more than 0.9 percent by weight, or, in some cases, no more than 0.5 percent by weight, based on the total weight of the ethylenically unsaturated monomer composition, of an ether group containing ethylenically unsaturated monomer. In certain embodiments, the ethylenically unsaturated monomer composition is free of any ether group containing ethylenically unsaturated monomer.

In certain embodiments, the ethylenically unsaturated monomer composition from which the ungelled acrylic polymer is formed includes less than 5 percent by weight, such as no more than 1 percent by weight, or, in some cases, no more than 0.5 percent by weight, based on the total weight of the ethylenically unsaturated monomer composition, of a monoethylenically unsaturated carboxylic acid amide monomer. In certain embodiments, the ethylenically unsaturated monomer composition is free of any monoethylenically unsaturated carboxylic acid amide monomer.

In certain embodiments, the ethylenically unsaturated monomer composition from which the ungelled acrylic polymer is formed does not include an epoxy group-containing ethylenically unsaturated monomer.

In certain embodiments, the ethylenically unsaturated monomer composition from which the ungelled acrylic polymer is formed includes less than 1 percent by weight, such as no more than 0.9 percent by weight, or, in some cases, no more than 0.5 percent by weight, based on the total weight of the ethylenically unsaturated monomer composition, of an acid, such as carboxylic acid, group containing ethylenically unsaturated monomer. In certain embodiments, the ethylenically unsaturated monomer composition is free of any of an acid, such as carboxylic acid, group containing ethylenically unsaturated monomer.

In certain embodiments, the ethylenically unsaturated monomer composition from which the ungelled acrylic polymer is formed is selected so as to provide a copolymer having a calculated glass transition temperature ("Tg") of no more than 40° C., such as no more than 20° C., more than 10° C., or, in some cases, no more than no more than 5° C. In certain embodiments, the ethylenically unsaturated monomer composition from which the ungelled acrylic polymer is formed is selected so as to provide a copolymer having a calculated Tg of at least −40° C., such as at least −20° C., at least −10° C., or, in some cases, at least 0° C. As used herein, calculated glass transition temperature (or "calculated Tg") refers to the Tg of a theoretical copolymer formed from the selected ethylenically unsaturated monomer composition when calculated as described in "The Chemistry of Organic Film Formers," D. H. Solomon, J. Wiley & Sons, New York, 1967, p. 29.

In certain embodiments, the additive polymer of the coating compositions of the present invention comprises an adduct of reactants comprising: (i) an at least partially unblocked isocyanate, and (ii) an active hydrogen-containing ungelled acrylic polymer of the type described herein. As will be appreciated, such an adduct comprises urethane linkage(s) resulting from the reaction of isocyanate groups with hydroxyl groups on the ungelled acrylic polymer. In certain embodiments, 10 to 100%, in some cases 20 to 80%, or, in yet other cases, 40 to 60%, of the hydroxyl groups present on the ungelled acrylic polymer are reacted with a free isocyanate group of an at least partially unblocked isocyanate functional reactant, such as a half-blocked diisocyanate, to form a corresponding number of urethane linkages.

Half-blocked diisocyanates suitable for use in the present invention include those in which a diisocyanate is reacted with a blocking agent so that one of the two isocyanate groups is blocked while the other isocyanate group remains unblocked. Suitable diisocyanates include, but are not limited to, toluenediisocyanate, isophorone diisocyanate, and hexamethylenediisocyanate, including combinations of two or more thereof. In certain of these embodiments, the blocking agent comprises an alcohol, such as tridecanol, lauryl alcohol, octadecyl alcohol, oleyl alcohol, octyl alcohol, behenyl alcohol, or a combination of two or more thereof.

In the coating compositions of the present invention the additive polymer, i.e., the previously described ungelled acrylic polymer and/or the adduct of such a polymer with an at least partially unblocked isocyanate, is rendered dispersible in an aqueous medium by treatment with an acid to form a water-dispersible cationic salt group-containing ungelled acrylic polymer as is described above.

In certain embodiments, the electrodepositable coating composition may further comprise a curing catalyst, which may be used to catalyze the reaction between the curing agent and the reactive functional groups of the film forming polymer(s). Suitable curing catalysts that may be used as in the present invention include, without limitation, organotin compounds (e.g., dibutyltin oxide, dioctyltin oxide) and salts thereof (e.g., dibutyltin diacetate); other metal oxides (e.g., oxides of cerium, zirconium and/or bismuth) and salts thereof (e.g., bismuth sulfamate and/or bismuth lactate), a cyclic guanidine (as described in U.S. Pat. No. 7,842,762 at col. 1, line 53 to col. 4, line 18 and col. 16, line 62 to col. 19, line 8, the cited portions of which being incorporated herein by reference), zinc, or combinations thereof.

The electrodepositable coating composition described herein may be applied alone or as part of a coating system that can be deposited onto a number of different substrates. The coating system typically comprises a number of coating layers. A coating layer is typically formed when a coating composition that is deposited onto the substrate is substantially cured or dried by methods known in the art (e.g., by thermal heating).

Suitable substrates that can be coated with the electrodepositable coating composition described herein include, without limitation, metal substrates, metal alloy substrates, and/or substrates that have been metalized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or a zirconium containing solution such as described in U.S. patent application Ser. Nos. 11/610,073 and 11/833,525. Alternatively, in other embodiments, the substrate is not pretreated with a pretreatment solution prior to coating the substrate with the coating composition described herein.

In certain embodiments, the electrodepositable coating composition of the present invention is applied over a bare (i.e., non-pretreated) substrate. However, in some embodiments, the electrodepositable coating composition of the present invention can be applied to a substrate that has been pretreated. After the electrodepositable coating composition is cured, a primer-surfacer coating composition may be applied onto at least a portion of the electrodepositable coating composition. The primer-surfacer coating composition is often applied to the electrodepositable coating layer and cured prior to a subsequent coating composition being applied over the primer-surfacer coating composition.

The primer-surfacer layer that results from the primer-surfacer coating composition serves to enhance chip resistance of the coatings system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. Pat. No. 7,868,085.

In some embodiments, the primer-surfacer coating composition is not used in the coating system. Therefore, a color imparting coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

Synthesis of Acrylic-Urethane Crater Control Additive 156 grams methylisobutyl ketone (MIBK) was charged to a three liter flask under a nitrogen atmosphere. The solution was heated to 112° C. A mixture of 134.8 g ethyl acrylate, 202.2 g hydroxylethyl acrylate, 38 g α-methyl styrene dimer, 236 g dimethylaminoethyl methacrylate, 101.2 g 2-ethylhexylacrylate, 26 g 2,2'-azobis(2-methylbutyronitrile), and 20 g methylisobutyl ketone were then added drop wise to the flask over 150 minutes. Upon completion of the addition, the solution was held at 110° C. for 30 minutes. A mixture of 6 g hexaneperoxoic acid, 2-ethyl-1,1-dimethylpropyl ester and 10 g methylisobutyl ketone were then added to the flask and the mixture was held at 110° C. for 30 minutes. A second mixture of 6 g hexaneperoxoic acid, 2-ethyl-1,1-dimethylpropyl ester and 10 g methylisobutyl ketone were then added to the flask and the mixture was held at 110° C. for an additional 30 minutes. The reaction was cooled to 70° C. and a mixture of 389 g half capped isophorone diisocyanate[1] and 0.8 g dibutyltin dilaurate was added over 10 minutes. One hour after the addition was completed; complete reaction was verified by the disappearance of the NCO stretch in the infrared spectrum. The solution was then dispersed into a mixture of 538 g deionized water and 43.7 g sulfamic acid. After stirring for an hour, 1,509.4 g deionized water were added to the solution. The solution was then distilled under vacuum at 60-65° C. and 22 inches Hg. Approximately 1,000 g solvent were removed.

Example 2

Synthesis of Blocked Isocyanate 463.1 g 2,4-toluene diisocyanate (5.32 eq) were charged to a 2 liter flask under a nitrogen atmosphere. A mixture of 6.7 g acetic acid and 560 g tridecyl alcohol (2.80 eq) were then added over 60 minutes. During the addition, the temperature was maintained below 50° C. After the addition was complete, 53.2 g methylisobutyl ketone were added and the reaction held at 40° C. for one hour. The mixture was titrated and found to have an isocyanate equivalent weight of 447 (theoretical equivalent weight of 426).

Example 3

Synthesis of Crosslinker

| # | Material | gm |
| --- | --- | --- |
| 1 | Rubinate M[1] | 1876.00 |
| 2 | Dibutyltin dilaurate | 0.35 |
| 3 | MIBK | 21.73 |
| 4 | Diethyleneglycol monobutyl ether | 454.24 |
| 5 | Ethyleneglycol monobutyl ether | 1323.62 |
| 6 | MIBK | 296.01 |

[1]A polymeric MDI available from Huntsman Corporation

Items 1, 2 and 3 were charged to a 4 neck round bottom flask, fit with a stirrer, temperature measuring probe and $N_2$ blanket. Charge 4 was added slowly allowing the temperature to increase to 60° C. The mixture was then held at 60° C. for 30 minutes. Charge 5 was then added over about 2 hours allowing the temperature to increase to a maximum of 110° C.

Charge 6 was then added and the mixture was held at 110° C. until the i.r. spectrum indicated no residual isocyanate.

Example 4

Preparation of Epoxy Resin Main Vehicle

| # | Material | gm |
|---|---|---|
| 1 | Epon® 828[1] | 614.68 |
| 2 | Bisphenol A | 265.42 |
| 3 | MACOL 98 A MOD 1[2] | 125.0 |
| 4 | Methylisobutyl ketone (mibk) | 31.09 |
| 5 | Ethyltriphenyl phosphonium iodide | 0.60 |
| 6 | MACOL 98 A MOD 1 | 125.00 |
| 7 | Methylisobutyl ketone (mibk) | 50.10 |
| 8 | Crosslinker (from Example 3) | 894.95 |
| 9 | Ketimine[3] | 57.01 |
| 10 | N-methyl ethanolamine | 48.68 |
| 11 | Sulfamic acid | 40.52 |
| 12 | $H_2O$ | 1196.9 |
| 13 | Gum rosin solution[4] | 17.92 |
| 14 | $H_2O$ | 1623.3 |
| 15 | $H_2O$ | 1100.0 |

[1]Epoxy resin available from Hexion Specialty Chemicals.
[2]Bisphenol ethylene oxide adduct available from BASF Corporation.
[3]MIBK diketimine of diethylene triamine at 72.7% in MIBK.
[4]30% by weight solution of gum rosin in diethylene glycol mono butyl ether formal.

Items 1, 2, 3, 4 and 5 were charged to a 4 neck round bottom flask, fit with a stirrer, temperature measuring probe, $N_2$ blanket and heated to 130° C. The mixture exothermed to about 150° C. The temperature was allowed to drop to 145° C. and held at this temperature for 2 hours. Charges 6 and 7 were then added. Charges 8, 9 and 10 were added and the mixture was held at 122° C. for two hours. 1991 g of the reaction mixture was poured into a solution of items 11 and 12 with good stirring. Charge 13 was then added and the resulting dispersion was mixed for thirty minutes and then charge 14 was added with stirring over about 30 minutes and mixed well. Charge 15 was added and mixed well. About 1100 g of water and solvent were distilled off under vacuum at 60-65° C. The resulting aqueous dispersion had a solids content of 42.8%.

Example 5

Preparation of Control Electrodeposition Bath 993 grams of the epoxy resin main vehicle of Example 4 was placed in a plastic one gallon container with approximately 500 grams of deionized water. The mixture was stirred with a three inch long football shaped magnetic stirring bar at approximately 500 rpm. 17 grams of a 1/1 mixture of butyl cellosolve and butylcarbitol formal (FEX-1651) were added as a thin stream from a large (12 inch long) plastic pipette. Additionally 13 grams of butyl cellosolve were added in the same manner. After stirring for more than 10 minutes, the 144 grams of pigment paste E 6364 available from PPG Industries was added using back weighing technique so that the paste was added directly to the stirring resin blend. After stirring for 10 minutes, an additional 750 grams of water was added to yield a net bath weight of approximately 2417 grams. This electrocoat bath was filtered through one layer of oil absorbent cloth and a cloth filter rated at 10 microns into a plastic coating container. Approximately 100 grams of water was used to rinse the filters into the bath and an additional approximately 200 grams of water was added.

Example 6

Preparation of Electrodeposition Bath with Urethane-Acrylic Crater Control Additive of Example 1

The electrocoat paint bath of this example was made in a similar fashion to Example 5 with the following exceptions: Instead of 993 grams of epoxy resin main vehicle of Example 4, 943 grams of the epoxy resin main vehicle of Example 4 were used along with the 17 grams of 1:1 butyl cello solve: butylcarbitol-formal. 71 grams of the acrylic-urethane dispersion (30% solids) from Example 1 was further diluted in the following manner: the 71 gram sample of acrylic-urethane dispersion was blended with 13 grams of butyl cello solve and approximately 135 grams of water and stirred with a propeller-type mixer for one half hour. This diluted acrylic-urethane was added to the stirring resin mixture before addition of the 144 grams of E6364 paste.

Example 7

Coatouts

Both electrocoat baths (Examples 5 and 6) were agitated using a magnetic stirring stirrer and the bath temperature was maintained using a stainless steel cooling coil which also served as the anode for the electrodeposition process.

Coat outs were performed in the usual manner of cationic electrodeposition. In this case the cathode was a cold rolled steel panel pretreated with Chemfos C700 (from PPG Industries). The 4 inch by 12 inch panels were immersed 8 inched into the paint bath. The coat outs were performed using parameters in the following table using a 30 second ramp to voltage. Following coat out the panels were spray rinsed with deionized water and allowed to dry for between 5 and 30 minutes. The coated panels were then baked for 25 minutes in a forced air electric oven at 350° F.

Example 8

Crater Resistance and Topcoat Adhesion

Panels were coated as shown in the following table. Crater defects were counted for the front and back surfaces of the panels and the results summarized in the Tables below.

To test topcoat adhesion 25.5 grams of C354/W.404, a white alkyd topcoat paint was mixed with 11.5 grams of n-butyl acetate and drawn down over the baked electrocoat panels of examples (11 EJV 2949 #1 and 11EJV 2959 #2) as shown in the results table. The now-topcoated panels were flashed for 10 minutes and then baked for 30 minutes at 300° F. in an electric oven.

The topcoat was then scribed using a multi-blade claw with 2 mm spaced teeth. Two sets of scribes were made perpendicular to each other such that 2 mm by 2 mm square cuts were made throught the paint film. Paint adhesion was tested by placing 3M 898 tape over the scribed area, pressing it down firmly, and then removing it rapidly. Adhesion was recorded on a scale from 0 to 10 where 0 equals complete paint removal (poor adhesion), and 10 equals no paint removal (good adhesion).

Bath compositions:

| Material | Example 5 | Example 6 |
|---|---|---|
| Example 4 (42.8% solids) | 993 | 943 |
| 1:1 butyl cellosolve: butylcarbitol-formal | 17 | 17 |
| buty cellosolve | 13 | |
| deionized water, approximate | 500 | 500 |
| | | Separate Blend: |
| Product Example 1 | | 71 |
| butyl cellosolve | | 13 |
| deionized water, approximate | | 135 |
| E 6364 pigment paste | 144 | 144 |
| deionized water | balance to 2700 g net weight | balance to 2700 g net weight |

| | Example 5 Coatouts | | | | | | | Example 5 Coatouts | | | | |
|---|---|---|---|---|---|---|---|---|---|---|---|---|
| | Panel 1 | Panel 2 | Panel 3 | Panel 4 | Panel 5 | Panel 6 | Panel 7 | Panel 1 | Panel 2 | Panel 3 | Panel 4 | Panel 5 |
| Bath Temperature, °F. | 90 | 88 | 90 | 88 | 88 | 88 | 86 | 90 | 88 | 90 | 90 | 90 |
| Voltage | 200 | 180 | 200 | 200 | 190 | 190 | 180 | 150 | 150 | 150 | 150 | 150 |
| Coulombs used | 34 | 31 | 34 | 33 | 30 | 31 | 28 | 35 | 32 | 36 | 36 | 35 |
| Ending amps | 0.15 | 0.14 | 0.16 | 0.15 | 0.14 | 0.14 | 0.12 | 0.16 | 0.16 | 0.15 | 0.15 | 0.16 |
| Baked film thickness, mils | 1.04 | 0.89 | 1.03 | 0.94 | 0.9 | 0.87 | 0.76 | 0.90 | 0.80 | 0.90 | 0.88 | 0.90 |
| Craters on front (4″ × 8″) | 22 | 11 | 8 | 19 | 32 | 20 | 10 | 1 | 0 | 1 | 1 | 0 |
| Craters on Back (4″ × 8″) | 19 | 9 | 3 | 9 | 18 | 15 | 8 | 2 | 2 | 2 | 0 | 2 |
| Total craters on panel | 41 | 20 | 11 | 28 | 50 | 35 | 18 | 3 | 2 | 3 | 1 | 2 |
| Adhesion: White Alkyd # 80 drawbar 1.2 mils | | | | | | 10 | | | | | 10 | |
| Adhesion: White Alkyd # 60 drawbar 0.9 mils | | | | | 10 | | | | | | | 10 |

Crater Sum, 5 panels: 144    Crater Sum, 5 panels: 11

It is known that craters, as discreet-event defects, follow a Poisson distribution of frequency. A property of Poisson Distributions is that their standard deviation (commonly named sigma) is the square root of the mean. If for example, an average defect count is 100, one can use + or −1 sigma to predict that some next measurement will be 100 + or −20 defects to a 95% confidence level (+ or −2 sigma).

A mathematical comparison of different Poisson distributions can be used to calculate the chances that two measured distributions came from an identical distribution of results and that the observed difference in mean is due to sampling error. When one compares a crater count of 144 to a crater count of 11 using this comparison, one finds that the probability that the difference in the two results can be found by chance alone is 1 part in $10^{26}$. Thus, the crater control additive of the present invention is very effective at reducing craters defects in cationic electrocoat. The math in used in calculating the Poison distributions was as follows:

Input Area

| | |
|---|---|
| Total Counts, System 1 (Example 5): | 144 |
| Total Counts, System 2 (Example 6): | 11 |

-continued

Input Area

| | |
|---|---|
| Overall Average | 77.5 |
| Critical Chi-Square for 95% Confidence | 3.841 |
| Calculated Chi-Square | 114.12 |
| P-Value for Equal Mean Counts (in Scientific Notation): | 1.2E−26 |

(Note-Test assumes there is an equal number of panels per system)

What is claimed is:

1. An electrodepositable coating composition comprising:
   (a) an active hydrogen-containing cationic salt group-containing polymer; and
   (b) 0.1 to 20 percent by weight, based on the total weight of resin solids in the coating composition, of a cationic salt group-containing ungelled acrylic polymer, different from (a), that comprises a reaction product of an ethylenically unsaturated monomer composition comprising:
      (i) a hydroxy-functional ethylenically unsaturated monomer;
      (ii) at least 10 percent by weight, based on the total weight of the ethylenically unsaturated monomer composition, of an amine-functional ethylenically unsaturated monomer;

(iii) 10 to 40 percent by weight, based on the total weight of the ethylenically unsaturated monomer composition, of an alkyl(meth)acrylate having at least 8 carbon atoms in the alkyl group; and at least one of:

(iv) 1 to 20 percent by weight, based on the total weight of the ethylenically unsaturated monomer composition, of an alkyl(meth)acrylate having less than 8 carbon atoms in the alkyl group, and (v) 1 to 30 percent by weight, based on the total weight of the ethylenically unsaturated monomer composition, of a vinyl aromatic monomer.

2. The electrodepositable coating composition of claim 1, wherein the ungelled acrylic polymer is present in an amount of 2 to 8 percent by weight, based on the total weight of resin solids in the coating composition.

3. The electrodepositable coating composition of claim 1, wherein the hydroxy-functional ethylenically unsaturated monomer is present in an amount of at least 10 percent by weight and no more than 60 percent by weight, based on the total weight of the ethylenically unsaturated monomer composition.

4. The electrodepositable coating composition of claim 1, wherein the ethylenically unsaturated monomer composition includes less than 1 percent by weight, based on the total weight of the ethylenically unsaturated monomer composition, of an ether group containing ethylenically unsaturated monomer.

5. The electrodepositable coating composition of claim 1, wherein the ethylenically unsaturated monomer composition does not include an epoxy group-containing ethylenically unsaturated monomer.

6. The electrodepositable coating composition of claim 1, wherein the composition comprises an adduct of an at least partially unblocked isocyanate and the ungelled acrylic polymer.

7. An electrodepositable coating composition comprising:
(a) an active hydrogen-containing cationic salt group-containing polymer; and
(b) 0.1 to 20 percent by weight, based on the total weight of resin solids in the coating composition, of a cationic salt group-containing ungelled acrylic polymer, different from (a), that comprises a reaction product of an ethylenically unsaturated monomer composition comprising:
(i) a hydroxy-functional ethylenically unsaturated monomer;
(ii) at least 10 percent by weight, based on the total weight of the ethylenically unsaturated monomer composition, of an amine-functional ethylenically unsaturated monomer; and
(iii) an alkyl(meth)acrylate having at least 8 carbon atoms in the alkyl group; wherein the ethylenically unsaturated monomer composition comprises less than 1 percent by weight, based on the total weight of the ethylenically unsaturated monomer composition, of an ether group containing ethylenically unsaturated monomer.

8. The electrodepositable coating composition of claim 7, wherein the ethylenically unsaturated monomer composition comprises 10 to 40 percent by weight percent, based on the total weight of the ethylenically unsaturated monomer composition, of the alkyl(meth)acrylate having at least 8 carbon atoms in the alkyl group.

9. The electrodepositable coating composition of claim 7, wherein the ethylenically unsaturated monomer composition comprises at least one of (iv) 1 to 20 percent by weight, based on the total weight of the ethylenically unsaturated monomer composition, of an alkyl(meth)acrylate having less than 8 carbon atoms in the alkyl group, and (v) 1 to 30 percent by weight, based on the total weight of the ethylenically unsaturated monomer composition, of a vinyl aromatic monomer.

10. The electrodepositable coating composition of claim 7, wherein the hydroxy-functional ethylenically unsaturated monomer is present in an amount of at least 10 percent by weight and no more than 60 percent by weight, based on the total weight of the ethylenically unsaturated monomer composition.

11. The electrodepositable coating composition of claim 7, wherein the ungelled acrylic polymer does not result from reaction of an acrylic copolymer comprising oxirane rings that is reacted with a secondary amine to open the oxirane ring with the secondary amine.

12. The electrodepositable coating composition of claim 7, wherein the composition comprises an adduct of an at least partially unblocked isocyanate and the ungelled acrylic polymer.

13. The electrodepositable coating composition of claim 12, wherein the at least partially unblocked isocyanate comprises a half-blocked diisocyanate.

14. An electrodepositable coating composition comprising:
(a) an active hydrogen-containing cationic salt group-containing polymer; and
(b) 0.1 to 20 percent by weight, based on the total weight of resin solids in the coating composition, of an adduct of reactants comprising:
(i) an at least partially unblocked isocyanate; and
(ii) an active hydrogen-containing ungelled acrylic polymer having a calculated glass transition temperature of no more than 40° C.

15. The electrodepositable coating composition of claim 14, wherein the calculated glass transition temperature is at least −20° C. and no more than 20° C.

16. The electrodepositable coating composition of claim 15, wherein the calculated glass transition temperature is at least 0° C. and no more than 10° C.

17. The electrodepositable coating composition of claim 14, wherein the ungelled acrylic polymer is a reaction product of an ethylenically unsaturated monomer composition comprising:
(A) a hydroxy-functional ethylenically unsaturated monomer; and
(B) an amine-functional ethylenically unsaturated monomer.

18. The electrodepositable coating composition of claim 17, wherein the hydroxy-functional ethylenically unsaturated monomer is present in an amount of at least 10 percent by weight and no more than 60 percent by weight, based on the total weight of the ethylenically unsaturated monomer composition.

19. The electrodepositable coating composition of claim 18, wherein the amine-functional ethylenically unsaturated monomer is present in an amount of at least 10 percent by weight, based on the total weight of the ethylenically unsaturated monomer composition.

20. The electrodepositable coating composition of claim 19, wherein the ethylenically unsaturated monomer composition further comprises 10 to 40 percent by weight percent, based on the total weight of the ethylenically unsaturated monomer composition, of an alkyl(meth)acrylate having at least 8 carbon atoms in the alkyl group.

21. The electrodepositable coating composition of claim 20, wherein the ethylenically unsaturated monomer composition comprises at least one of (i) 1 to 20 percent by weight, based on the total weight of the ethylenically unsaturated monomer composition, of an alkyl(meth)acrylate having less than 8 carbon atoms in the alkyl group, and (ii) 1 to 30 percent by weight, based on the total weight of the ethylenically unsaturated monomer composition, of a vinyl aromatic monomer.

* * * * *